United States Patent [19]

Hehl

[11] Patent Number: 4,850,841

[45] Date of Patent: Jul. 25, 1989

[54] PLASTICIZING AND INJECTING UNIT FOR USE IN AN INJECTION MOLDING MACHINE

[76] Inventor: Karl Hehl, Arthur-Hehl-Strasse 32, D-7298 Lossburg 1, Fed. Rep. of Germany

[21] Appl. No.: 252,939

[22] Filed: Oct. 4, 1988

[30] Foreign Application Priority Data

Oct. 20, 1987 [DE] Fed. Rep. of Germany ....... 3735419

[51] Int. Cl.$^4$ ............................................. B29C 45/62
[52] U.S. Cl. ................................. 425/190; 425/192 R
[58] Field of Search ........... 425/182, 185, 190, 192 R, 425/574

[56] References Cited

U.S. PATENT DOCUMENTS

| | | | |
|---|---|---|---|
| 4,668,178 | 5/1987 | Hehl | 425/589 |
| 4,680,002 | 7/1987 | Hehl | 425/574 |

FOREIGN PATENT DOCUMENTS 2065189 4/1970 Fed. Rep. of Germany .
7046626 3/1971 Fed. Rep. of Germany .

*Primary Examiner*—Jay H. Woo
*Assistant Examiner*—Timothy W. Heitbrink
*Attorney, Agent, or Firm*—Spencer & Frank

[57] ABSTRACT

A plasticizing and injecting unit for use in an injection molding machine, having a carrier and supply block (10), which includes a pair of second bores (14), which are symmetrical with respect to the injection axis (s—s), and a pair of third bores (13), which are also symmetrical to the injection axis. The second bores contain respective advance-retract cylinders (A). The third bores contain respective injection cylinders (E). The advance-retract cylinders (A) are operable to axially advance and retract the plasticizing and injecting unit. The injection cylinders (E) are operable to inject molten plastic material into the injection mold. The second bores (14) are symmetrical to a first plane (f—f), which defines an angle (α) with a horizontal plane (h—h) extending through the injection axis (s—s). The third bores are symmetrical to a second plane (e—e), which includes a second angle (β) with the horizontal plane.

13 Claims, 9 Drawing Sheets

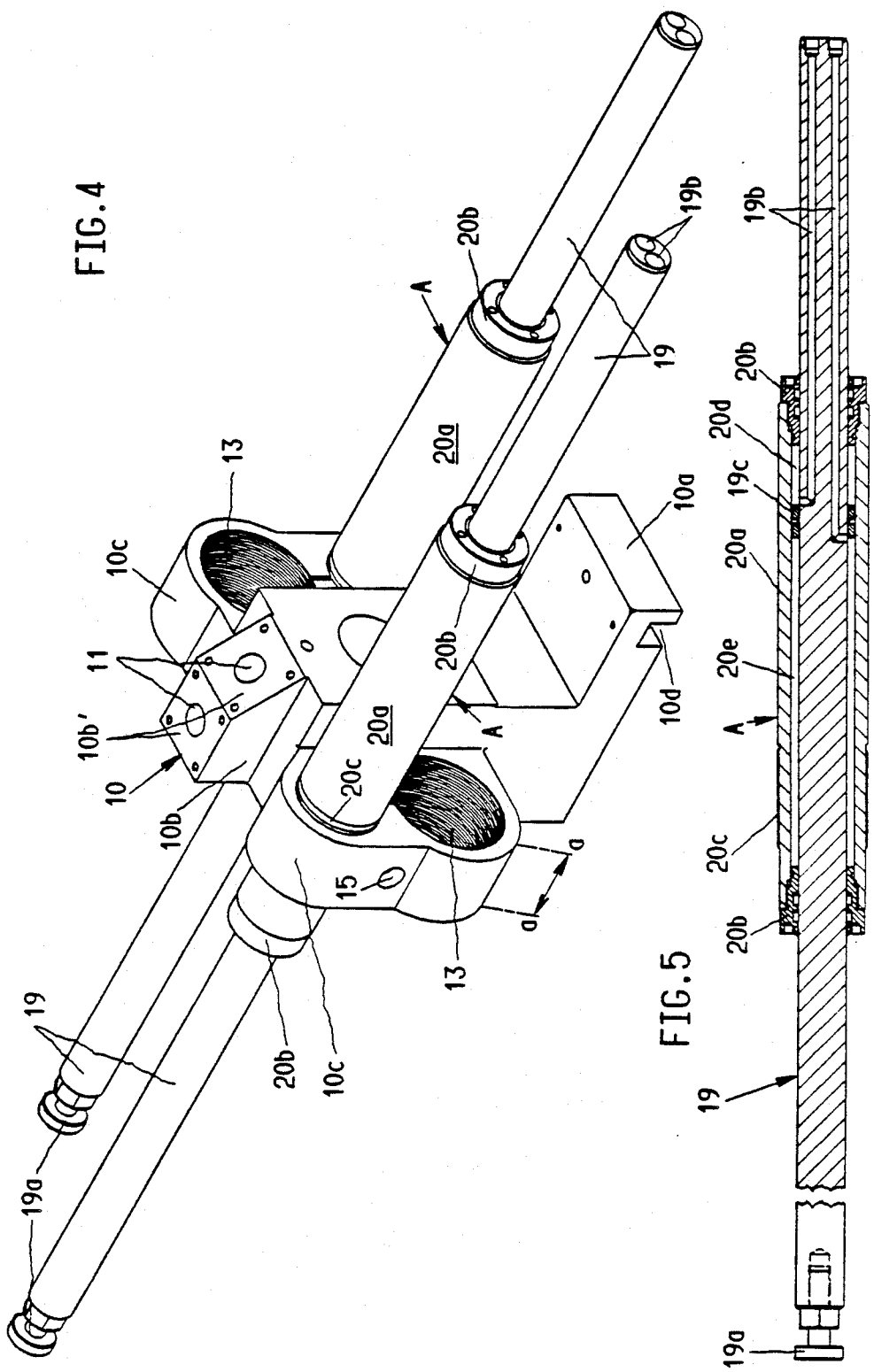

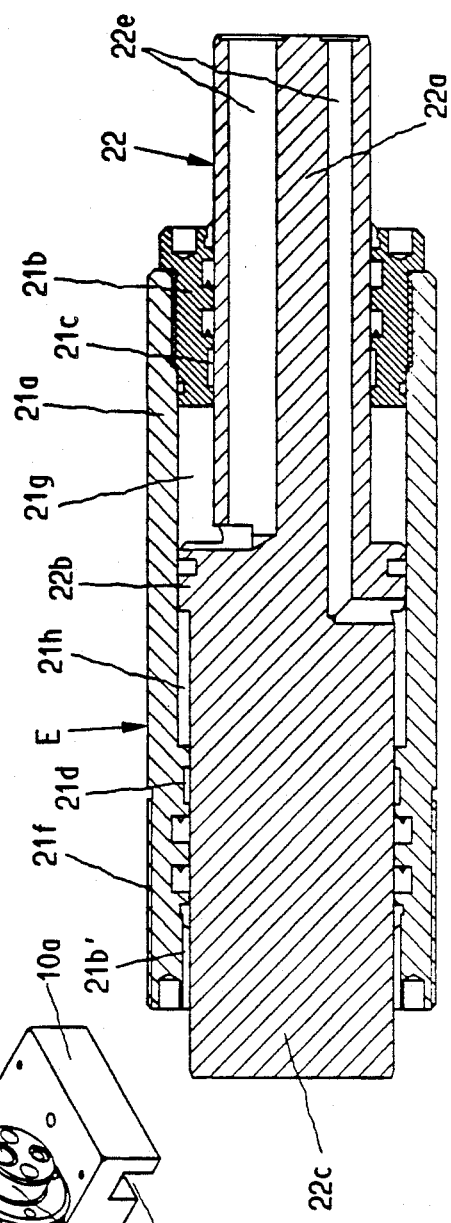
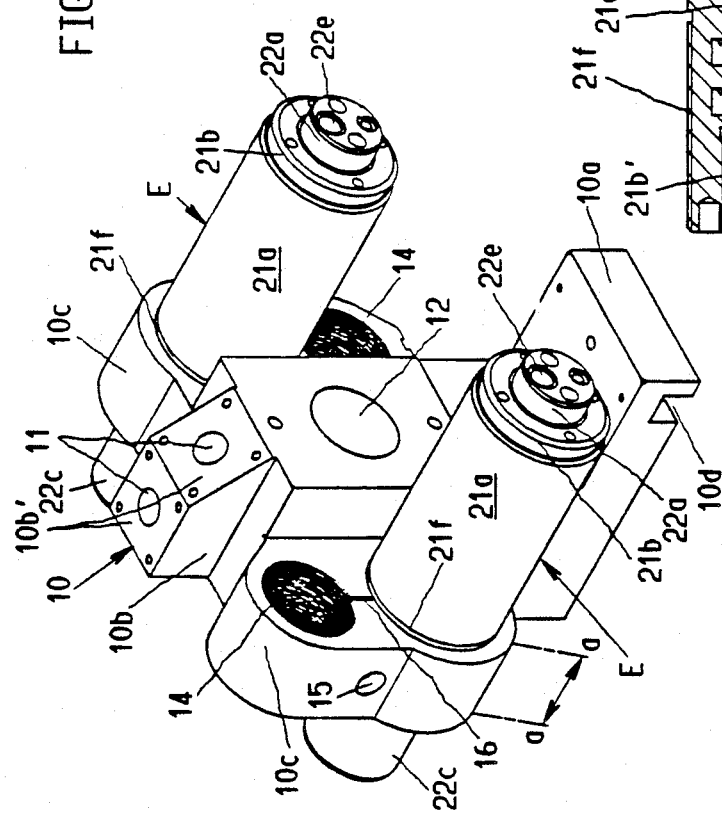

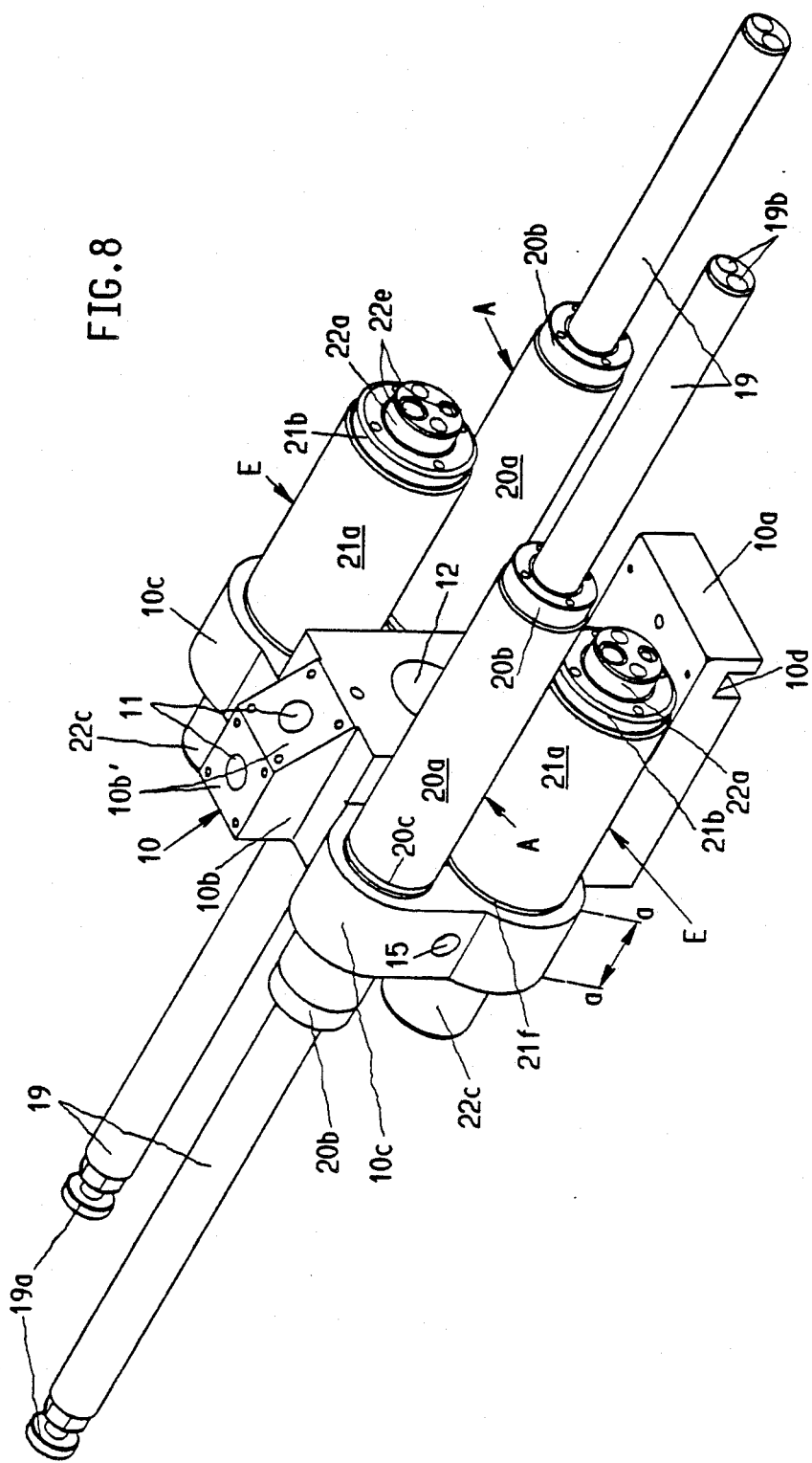

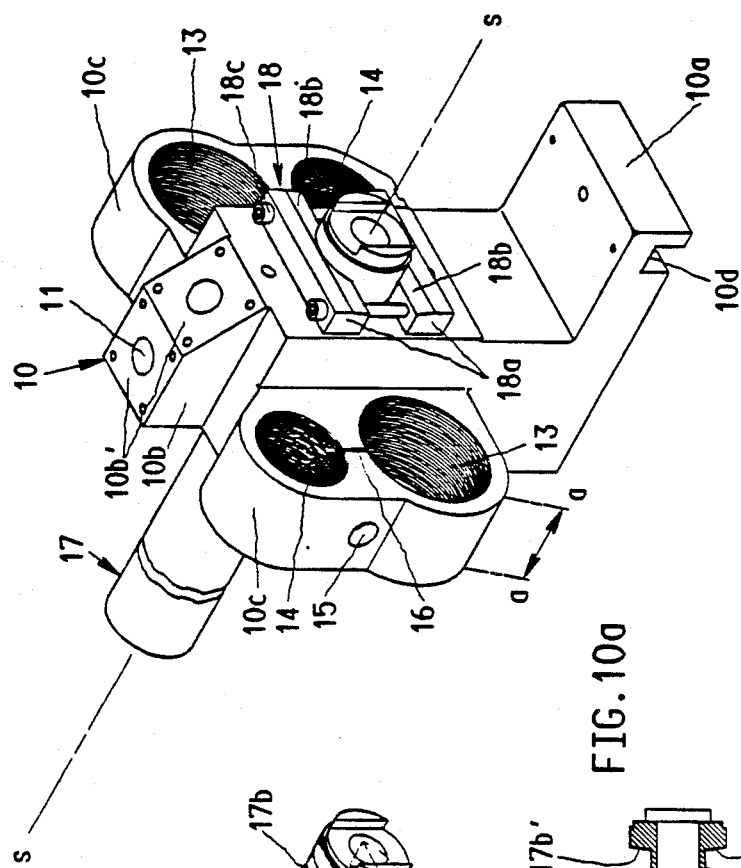
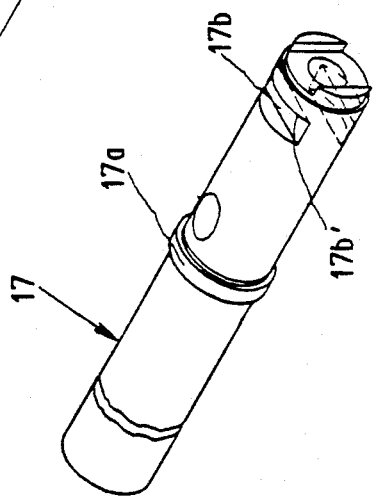
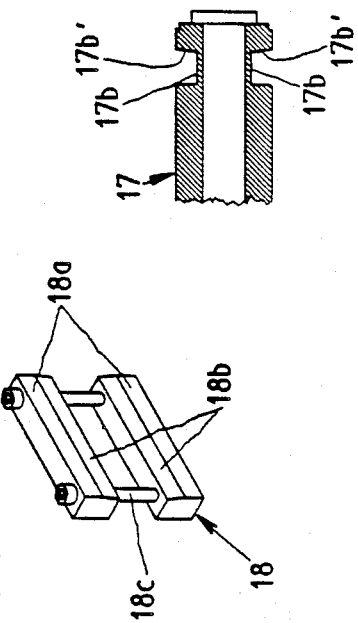

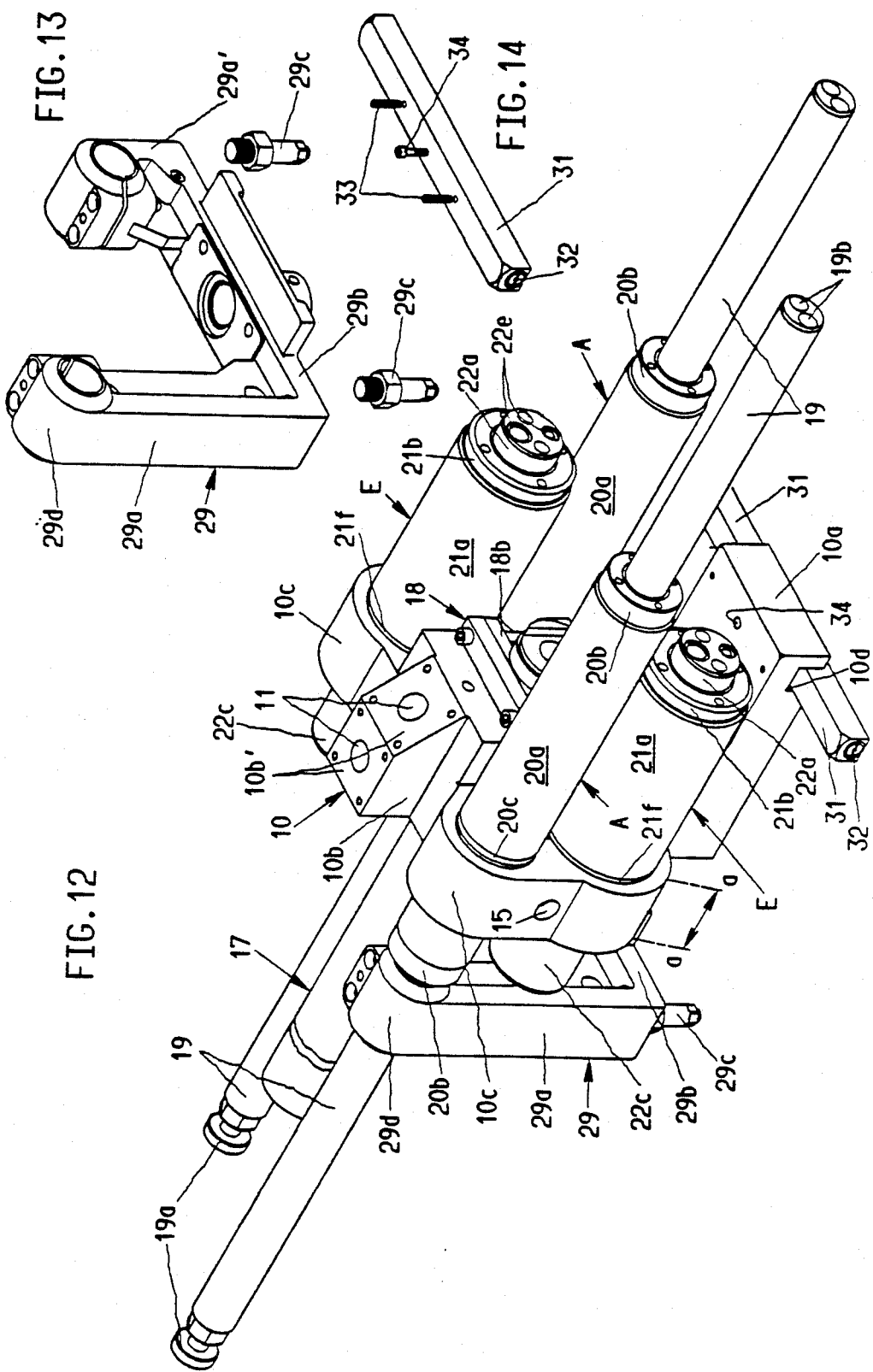

PLASTICIZING AND INJECTING UNIT FOR USE IN AN INJECTION MOLDING MACHINE

BACKGROUND OF THE INVENTION

This invention relates to a plasticizing and injecting unit for use in an injection molding machine, comprising a carrier and supply block, a plasticizing cylinder detachably mounted in said block, two hydraulic advance-retract cylinders, which are disposed in said block in bores which are symmetrical with respect to the injection axis and are operable to axially displace the plasticizing and injecting unit along guide rods and comprise pistons which are fixedly carried by said guide rods, and at last one hydraulic injection cylinder for axially displacing a feed screw, which is rotatably mounted in the plasticizing cylinder.

DESCRIPTION OF THE PRIOR ART

Units of said kind are known from U.S. Pat. Nos. 4,668,178 and 4,680,002 (FIG. 24). In said units the cylinders of the advance-retract cylinders consist of steel bushings and the front ends of said bushings bear on registering annular shoulders of the block. The associated cylinder covers consist of caps, which tightly surround the guide rods and extend almost throughout the axial length of the bores and are close fit in the latter. As a result, the advance-retract cylinders cannot be operated until the unit has been completly assembled. In a block of the kind described hereinbefore it is known from FIGS. 14 and 16 of the applicant's prior German Patent Application No. P 37 22 228.7-16 and a corresponding U.S. patent application Ser. No. 06/192,709 to arrange the guide rods and the advance-retract cylinders that the axes of said rods and cylinders lie in a plane which is at an angle to a horizontal plane through the injection axis.

It is also known, e.g., from German Patent Publication 2,065,189 to use the bores formed in the block as the cylinder structures of the advance-retract cylinders and the injection cylinders. In such arrangements the axes of the bores which are formed in the block and constitute the cylinder structures of the advance-retract cylinders extend in a plane which is at an angle of about 45° to a horizontal plane through the injection axis (injection molding machine, Series Monomat, Type 50, of Krauss-Maffei AG, Munich).

SUMMARY OF THE INVENTION

In view of the prior art discussed hereinbefore it is an object of the invention so to improve a plasticizing and injecting unit of the kind described first hereinbefore for use in an injection molding plastics that the requirements for an economical series production and for a quick performance of repairs, particularly in the premises of an operator, are met in an improved manner and to accomplish this mainly by the provision of an assembling of operable modules which can be replaced quickly in case of trouble.

To accomplish that object, in a unit of the kind described first hereinbefore each of the advance-retract cylinders is associated with one of the guide rods and comprises a piston, which is fixedly carried on said guide rod, and a cylinder structure comprising a cylinder member and two cylinder covers and constitutes a module and said modules are fitted in respective bores of the block, the injection cylinders constitute additional modules, which are fitted in additional bores, which are symmetrical to the axis of the injection nozzle, and the bores of each of said pairs are symmetrically disposed with respect to an associated plane, which includes an angle with a horizontal plane through the injection axis.

Such a unit for use in an injection molding machine differs from conventional units of the same kind in that it constitutes an assembly of freely accessible modules. The advance-retract cylinders and the injecting cylinders may be kept in stock and can be inserted with a small expenditure of work into the bores formed in the block. The plasiticizing cylinder can be removed from the block with a few manipulations or may be replaced in accordance with a program. The cylinders can be checked for their operative condition before they are fitted. In case of a trouble in the premises of an operator, the replacements which are required may be performed by labor which need not be highly skilled and the downtime which is involved can greatly be reduced. Finally, the plasticizing and injecting unit can be much more easily supervised by an operator owing to the modular construction of the unit in spite of the fact that the unit is highly compact.

In an embodiment of the invention the block consists of a casting and comprises wing portions which are disposed on opposite sides of the injection axis and have a smaller axial depth, each of said wing portions comprises a bore, which contains one of the advance-retract cylinders, and a bore, which contains one of the injection cylinders, said bores in each of said wing portions are symmetrical to a vertical plane and communicate with each other through a vertical slot, which contains said plane, and a clamp screw, which extends in each of said wing portions in a transverse bore that extends through said slot is operable to reduce the width of said gap and to deform the associated wing portion. In such an arrangement the advance-retract cylinders and the injection cylinders are inserted into the associated bores and are centered therein by means of measuring instruments and only thereafter are fixed in the correct positions in said block in that said clamp screws are tightened.

In an embodiment of the invention, each of the pistons contained in the ejection cylinders has a piston extension, which is smaller in diameter than the body of the piston and protrudes from the associated injection cylinder and said piston extensions are connected to the feed screw by a bridge, which carries a directional control valve and a flow control valve for controlling supply of hydraulic oil to the injection cylinders, hydraulic oil is adapted to be supplied to the working chambers of the advance-retract and injection cylinders through axial bores formed in the guide rods and in the pistons of the injecting cylinders, respectively. In that embodiment the hydraulic oil flows from the flow control valve through bores in the bridge and through axial bores in the pistons of the injection cylinders into the working chambers of the injection cylinders. Because the oil is supplied in that case exclusively via a rigid line system, which has no flexible portions which would breathe if they could expand under pressure, adverse influences on the control of the injecting molding operation will reliably be prevented.

BRIEF DESCRIPTION OF THE DRAWING

FIG. 4 shows the block of the unit with the advance-retract cylinders inserted therein.

FIG. 5 is an axial sectional view showing a advance-retract cylinder of the unit.

FIG. 6 shows the block of the unit and the injection cylinders inserted into said block.

FIG. 7 is an enlarged axial sectional view showing an injection cylinder.

FIG. 8 shows the block of the unit with the advance-retract cylinders and injection cylinders inserted therein.

FIG. 9 shows the block of the unit with the preloaded plasticizing cylinder.

FIG. 10 is a perspective view showing the plasticizing cylinder of the unit.

FIG. 10a is a sectional view showing the rear end of the plasticizing cylinder.

FIG. 11 shows the clamping means for locking the plasticizing cylinder in the block.

FIG. 12 is a perspective view showing the block of the unit with the inserted advance-retract cylinders, injection cylinders and plasticizing cylinder and with an inverted yoke for supporting the guide rods and means for adjustably supporting the block.

FIGS. 13 and 14 show, respectively, the inverted yoke and the bearing beam of the adjusting device of FIG. 12.

DESCRIPTION OF THE PREFERRED EMBODIMENT

Figure 1:
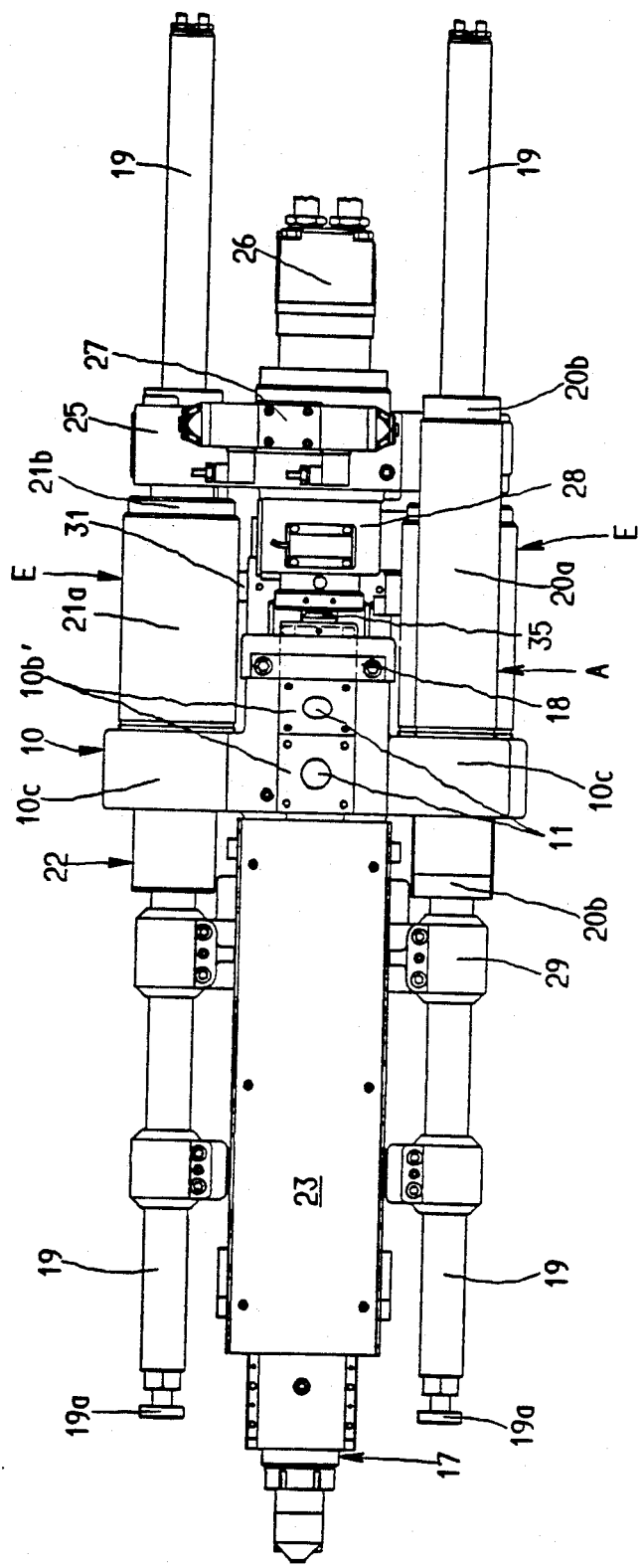
FIG. 1 is a top plan view showing the plasticizing and injecting unit for use in an injection molding machine.

An illustrative embodiment of the invention will now be described more in detail with reference to the drawing.

Figure 2:
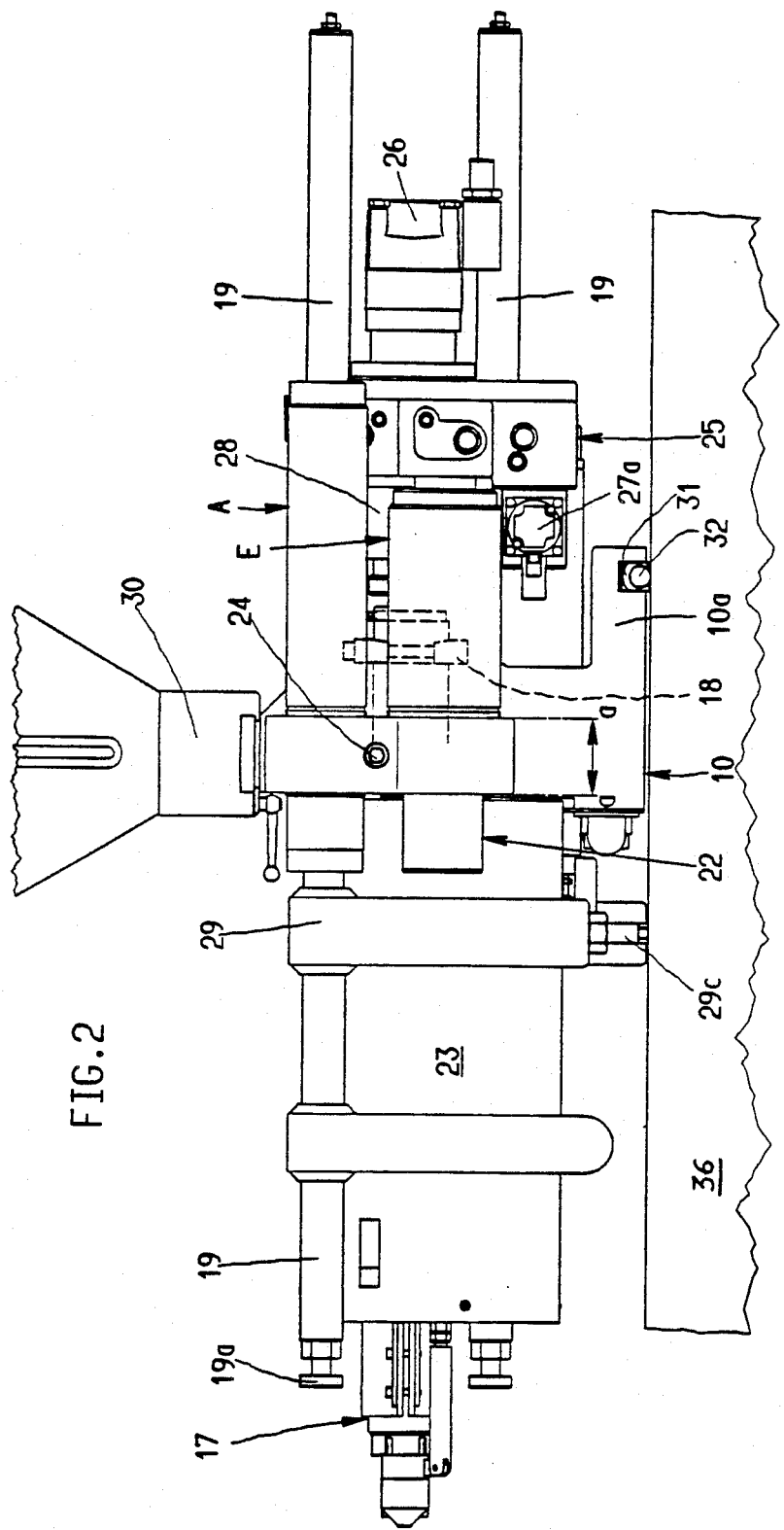
FIG. 2 is a side elevation showing the unit of FIG. 1 which is supported on the base of an injection molding machine.
Figure 3A:
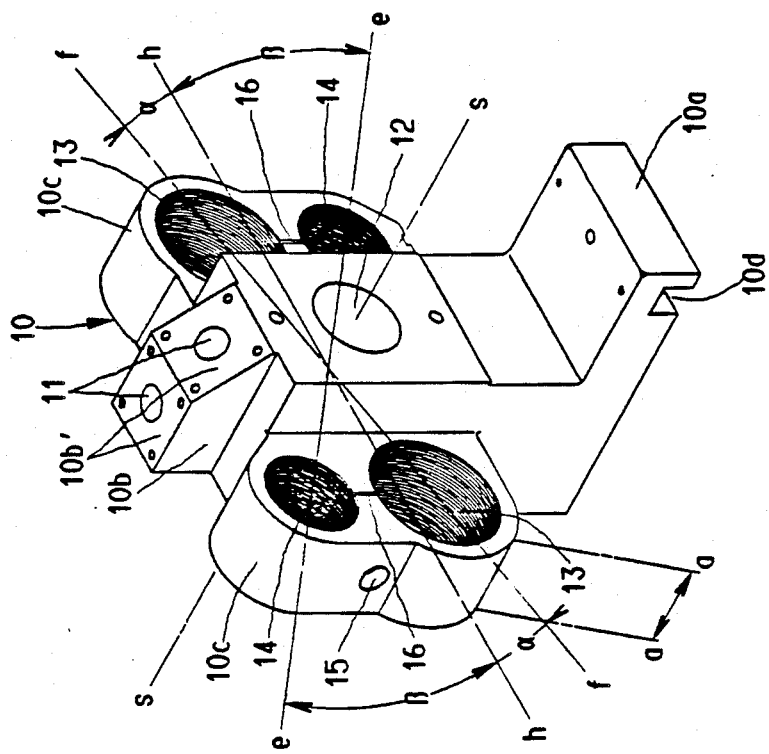
FIGS. 3 and 3a are perspective views showing the carrying and supply block which is associated with the plasticizing cylinder.
Figure 3:
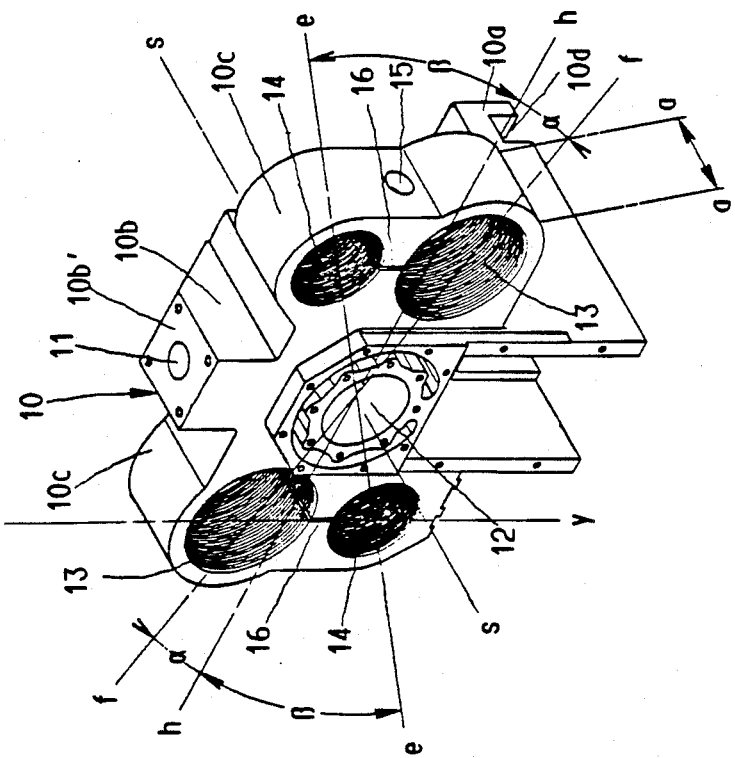

A plasticizing and injecting unit for use in an injection molding machine comprises a carrying and supply block 10, which contains a plasticizing cylinder 17, which is included in a more complex plasticizing unit, which is provided with heating means and enclosed by a protective housing 23. The block 10 is formed with a pair of second bores 14, which are symmetrical to the center line s—s of a bore 12, which is formed in the block 10 and contains the plasticizing cylinder 17. That center line s—s is also described herein as the injection axis of the unit. The two second bores 14 contain advance-retract cylinders A for axially displacing the unit along guide rods 19. The pistons 19c of the advance-retract cylinders A are fixedly mounted on the guide rods 19, which are adapted to be axially fixed by connectors 19a to the stationary platen (not shown) of the associated injection molding machine. It is apparent that each advance-retract cylinder is associated with a guide rod 19 and comprises a piston 19c fixed to said guide rod, and a cylinder structure, which comprises a cylinder member 20a consisting of a steel bushing, and two cylinder end caps 20b. The advance-retract cylinders A consists of respective modules, which extend in the second bores 14. The block 10 is formed with two third bores 13, which are also symmetrical to the injection axis s—s and contain hydraulic injection cylinders E for axially actuating a rotary feed screw 35, which is disposed in the plasticizing cylinder 17. As is particularly apparent from FIGS. 3 and 3a the third bores 13 containing the injection cylinders E and the second bores 14 containing the advance-retract cylinders A have axes which extend in respective planes f—f and e—e, which include angles $\alpha$ and $\beta$, respectively, with a horizontal plane h—h extending through the injection axis s—s. Each of the bores 13,14 is formed with female screw threads, which interengage with male screw threads 20c or 21f or the associated cylinders A and E. The block 10 comprises wing portions 10c, which are disposed on opposite sides of the injection axis s—s and have a smaller axial depth a—a than the body of the block and contain the bores 13 and 14. Because the advance-retract cylinders A and the injection cylinders E, respectively, are diametrically arranged with respect to the injection axis s—s, each wing portion 10c is formed with a bore 14 for an advance-retract cylinder A and with a bore 13 for an injection cylinder E and each of the bores 13,14 in a given wing portion 10c is symmetrical with respect to a common vertical plane y—y (FIG. 3). The two bores 13,14 in each wing portion 10c communicate with each other through a narrow vertical slot 16, which contains the plane y—y. A clamp screw 24 (FIG. 2) is screwed into a tapped bore 15 formed in each wing portion 10c and extends through the narrow slot 16 and is operable to decrease the width of the narrow slot 16 and to elastically deform the wing portion 10c at the same time. Owing to that arrangement the clamp screws 24 (FIG. 4) can be tightened so that the advance-retract cylinders and the injection cylinders which have been screwed into the bores 13 and 14 are clamped in a centered position. As is particularly apparent from FIGS. 3 and 3a, in the present embodiment the angle $\beta$ included between the center plane e—e, which contains the center lines of the bores 14, and the horizontal plane h—h is more than twice the angle $\beta$ that is included by the plane f—f, which contains the center lines of the bores 13, and the horizontal plane h—h. In general, however, the angles $\alpha$ and $\beta$ may have any value between 0° and 90°. The two planes e—e and f—f contain the injection axis s—s. The advance-retract A and the injection cylinders E inserted in the block 10 are freely accessible. Each of the advance-retract cylinders A protrudes by two-thirds of its length from the rear end of the wing portion 10c of the block 10. Each of the injection cylinders E protrudes by more than one-half of its length from the rear end of the wing portion 10c. The block 10 is formed at its base with a parallel pipedic bracket 10a, which protrudes toward the rear and is provided at its rear end with a device for adjusting and supporting the block 10. That device comprises a horizontal bearing beam 31, which is received with a vertical clearance in a transverse groove 10d that is formed in the bottom surface of the bracket 10a. That bearing beam is provided at its ends with rollers 32, which bear on a planar supporting surface of the base of the injection molding machine. The block 10 is adapted to be fixed to the bearing beam 31 by means of vertical clamp screw 34, which extends through the bracket 10a and is screwed into the beam 31. The block 10 is adapted to be leveled relative to the beam 31 by two leveling screws 33, which are screwed into the bracket 10a and bear on the top surface of the beam 31 on opposite sides of the clamp screw 34. That arrangement is apparent from FIGS. 12 and 14. During a normal injection molding cycle, the unit will usually be moved into engagement with and away from the injection mold. During said cyclic advance-retract motion the block 10 "rolls" on the rollers 32, which only slightly protrude from the bottom of the mounting beam 31.

The design of the advance-retract cylinders A and the injection cylinders E is shown more in detail in FIGS. 4 and 7. The piston rods of the advance-retract cylinders A are constituted by the guide rods 19. The steel bushings 20a which constitute the cylinder members of the advance-retract cylinders A enclose the guide rods with a clearance so that the working spaces 20e and 20d are defined, which are adapted to be supplied with hydraulic oil in alternation through bores 19b formed in the associated guide rods 19 so that the unit is moved into engagement with the injection mold and is retracted from said mold in each injection molding cycle. For certain purposes the provision of only one advance-retract cylinder may be desirable.

Each of the injection pistons 22 of the injection cylinders E comprises a piston body 22b, with a piston extension 22a, which is smaller in diameter than the piston body 22b and protrudes from the cylinder cap 21b to the rear, and with a piston extension 22c, which is larger in diameter than the piston extension 22a and extends through the front cap 21b' of the cylinder.

Figure 15:
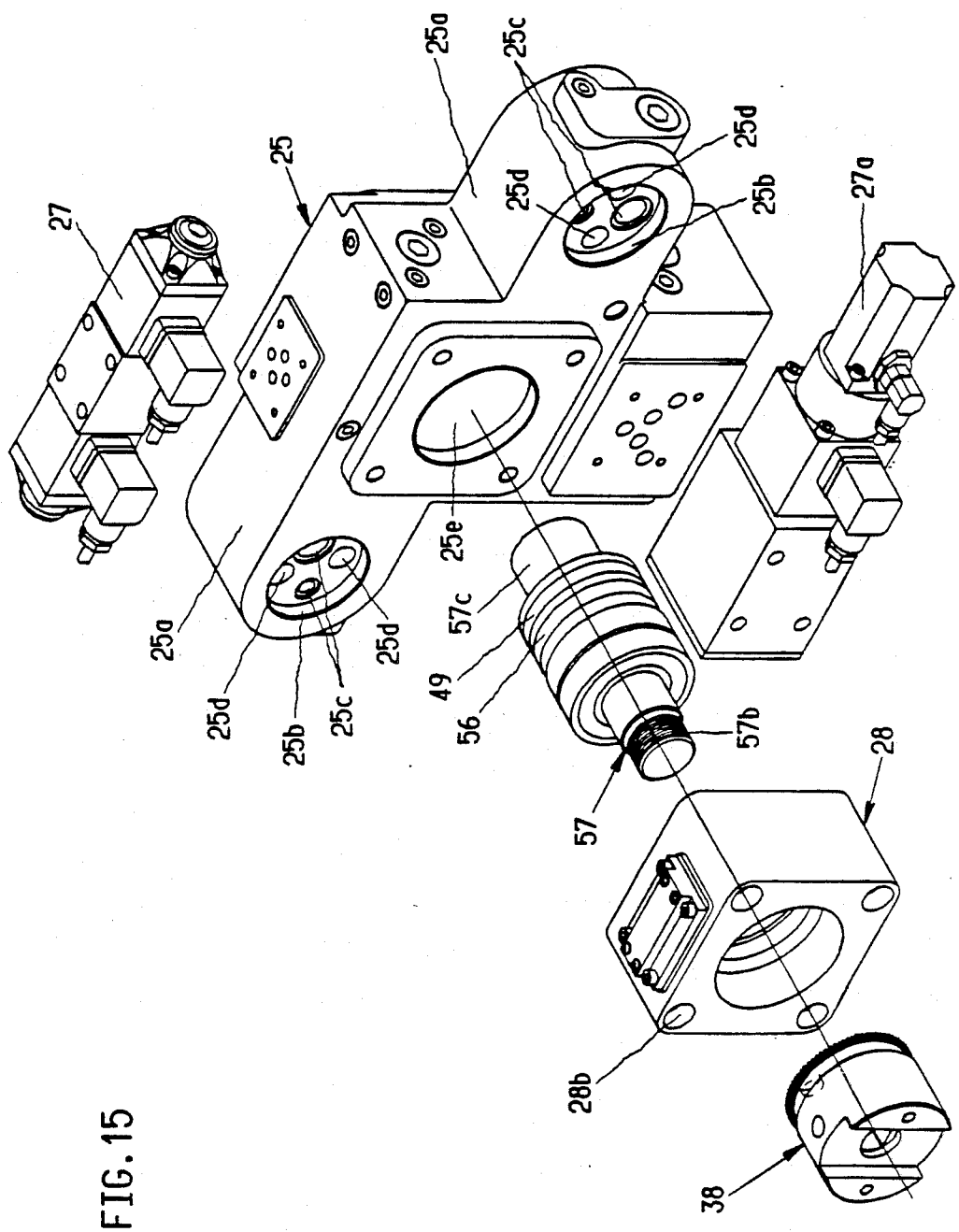
FIG. 15 shows the bridge which connects the injection cylinder.

A communication between the working chambers 21h and 21g can selectively be established during the injection molding operation so that the hydraulic oil which is displaced out of the working chamber 21h is fed into the working chamber 21g. The injection piston 22 is guided at one end of its piston body 22b on a guide ring 21d of the cylinder member 21a, which consists of a steel bushing, and the piston 22 is guided at the other end of the piston body 22b by a guide ring 21c in the cylinder end cap 21b. Those extensions 22a of the injecting pistons 22 which protude from the injection cylinders on the rear are connected to the feed screw 35 by a bridge 25 (FIGS. 1, 2), by which the motor 26 for rotating the feed screw 35 and a bearing bracket 28 are supported on the pistons 22 of the injection motors E. The bearing bracket 28 carries means for transmitting torque from the rotary motor 26 to the feed screw. Said transmitting means comprise a drive shaft 57, which is rotatably mounted in a central bore 25e of the bridge and carries at its rear end a coupling member 57c, which is coupled to a coupling member 38 that is secured to the feed screw 35. The coupling member 38 is screwed on screw threads 57b of the drive shaft so as to be nonrotatably coupled thereto in the tightening sense. The coupling member 38 is adapted to be connected to the feed screw 35 against a movement in the radial and axial directions. The drive shaft 57 is rotatably mounted by means of a radial bearing 56. A thrust bearing 49 is provided to ensure a transmission of the injection pressure from the bridge 25 to the drive shaft 57. The bearing bracket 28 is secured to the bridge 25 by fixing screws in bores 28b of the bracket 28 and receives and supports the forward portion of the drive shaft 57 and the rear portion of the coupling member 38. A directional control valve 27 and a flow control valve 27a associated with the injection cylinders E are mounted on the bridge 25. In response to an operation of the injection cylinders E, the hydraulic oil is supplied through the flow control valve 27a and through bores 25c in the bridge and through the axial bore 22e of the piston 22 into the working chamber 21h or 21g of each injection cylinder E. As is apparent from FIG. 15 the bridge comprises wing portions 25a, which are formed with cylindrical recesses 25b for receiving the rear ends of the pistons 22. Connectors for the pistons 22 are indicated at 25d. Owing to the provisions of such a rigid conduit system, which has no flexible sections that would expand under pressure, adverse influences on the control of the injection molding operation will reliably be avoided.

As is particularly apparent from FIGS. 12 to 14, the guide rods 19 are directly supported by a stationary inverted yoke 29 slightly in front of the forward ends of the advance retract cylinders A. The yoke 29 comprises a longer leg 29a and a shorter leg 29a', which are interconnected by a crosspiece 29b. The legs 29a,29a' are clamped on the guide rods 19 by clamp sleeves 29d. The yoke 29 is supported on a supporting surface of the base 36 of the injection molding machine by means of adjusting screws 29c for adjusting the height of the yoke 29 adjacent to each leg 29a,29a'.

The plasticizing cylinder 17 is adapted to be locked in the central bore 12 of the block 10 by means of a radial flange 17a, which is spaced from the rear end of the cylinder 17 and engages the front end face of the block 10, and by means of clamping elements 18a, which are provided on the rear end face of the block 10 and are comprised in a clamping device 18 (FIGS. 10 to 13). The clamping elements 18a are interconnected by bolts and nuts 18c. In the clamping position a profiled clamping member having a ramp 18b extends into a mating clamping groove 17b of the plasticizing cylinder so that the ramp 18b bears on a ramp 17b' of the clamping groove. As the nuts associated with the bolts 18c are rotated in a tightening sense, the ramps 18b of the clamping elements 18b slide up on the ramps of the plasticizing cylinder 17, which with its radial flange 17a bears on the forward end face of the block 10 and is axially prestressed by such tightening. The block 10 is integrally formed with a bracket 10b, which has surfaces 10b' for connection to means, such as a granule container 30, from which the plastic material enters one of the feed passages 11.

What is claimed is:
1. In a plasticizing and injecting unit for use in an injection molding machine, comprising
   a carrier and supply block, which has front and rear end faces, a first bore having a horizontal center line, which defines an injection axis, and a pair of second bores, which are parallel and symmetrical to said injection axis,
   a plasticizing cylinder, which is detachably mounted in said first bore,
   a feed screw, which is rotatably and axially displaceably mounted in said plasticizing cylinder and operable to discharge molten plastic material out of said block through said front end face,
   a plurality of guide rods, which are parallel to said injection axis,
   two hydraulic advance-retract cylinders, which are disposed in respective ends of said second bores and operable to displace said block along said guide rods, and
   hydraulic injection cylinder means, which are supported by said block and operatively connected to said feed screw and operable to axially reciprocate said feed screw,
   the improvement residing in that
   each of said advance-retract cylinders and an associated one of said guide rods constitute a module, said module comprising a cylinder structure, said cylinder structure comprising a cylinder member that is detachably mounted in one of said second bores and two cylinder end caps mounted on opposite ends of said cylinder member, said module also comprising a piston, which is fixedly carried by said associated guide rod and slidably mounted in said cylinder structure, said block formed with a pair of third bores, which are parallel and symmetrical to said injection axis, said injection cylinder means comprising two injection cylinders, which are detachably mounted in respective ends of said third bores, said second bores being symmetrical to a first plane, said first plane including a first angle with a horizontal plane extending through said injection axis, and said third bores being symmetrical to a second plane, said second plane including a second angle with said horizontal plane.

2. The improvement set forth in claim 1, wherein said first and second angles are different.

3. The improvement set forth in claim 1, wherein each of said second and third bores is formed with female screw threads and said injection cylinders and said cylinder members formed with respective male screw threads interengaging with female screw threads of the associated second and third bores, respectively.

4. The improvement set forth in claim 1, wherein said block consists of a casting having a central portion that is formed with said first bore and two wing portions, said wing portions are disposed on opposite sides of said injection axis and have a smaller length than said central portion along said injection axis, each of said wing portions formed with a vertical slot and with one of said second bores and one of said third bores, said second and third bores communicating with each other through said slot and having center lines lying on a vertical plane which extends through said slot, each of said wing portions formed on opposite sides of said slot with a transverse bore, which is open to said slot, and a clamp screw accessible from the outside of said block extending in said transverse bore and through said slot and is operable to elastically deform said wing portion so as to reduce the width of said slot.

5. The improvement set forth in claim 1, wherein said first and second planes extend through said injection axis and said first angle being more than twice said second angle.

6. The improvement set forth in claim 1, wherein said advance-retract cylinders and said injection cylinders are accessible from the outside of said block, said block having a central portion formed with said first bore and adjacent to said front end face, said central portion having two wing portions, said wing portions being disposed on opposite sides of said injection axis and having a smaller length than said central portion along said injection axis, said advance-retract cylinders axially protruding from said wing portions toward the rear face by about two-thirds of the length of said advance-retract cylinders, and said injection cylinders axially protruding from said wing portions toward the rear end by more than one-half of the length of said injection cylinders.

7. The improvement set forth in claim 1, wherein said block comprises at its rear end face a bracket having a horizontal bottom surface that is formed with a horizontal groove that is at right angles to said injection axis, and an adjusting and supporting device comprising a horizontal bearing beam extending with a vertical clearance in said groove and carries rollers, which are rotatably mounted in said beam at opposite ends thereof and protrude downwardly from said groove and are adapted to roll on a planar supporting surface, a vertical clamp screw, which extends through said bracket and is screwed into said beam and is adapted to secure said bracket to said beam, and two vertical leveling screws, which extend through and are screwed to said bracket on opposite sides of said clamp screw and are adjustable to vertically adjust said bracket relative to said beam on opposite sides of said clamp screw.

8. The improvement set forth in claim 1, wherein each of said injection cylinders comprises a cylinder structure having front and rear ends and a piston that comprises a piston body which is axially slidably mounted in said cylinder structure and an extension that is smaller in diameter than said piston body and protrudes from said cylinder structure at said rear end thereof, said extension being connected by a bridge to said feed screw, said pistons of said injection cylinders formed with piston bores communicating with the interior of the associated injection cylinders and said bridge carrying a directional control valve and a flow valve communicating with said piston bores.

9. The improvement set forth in claim 8, wherein said guide rods are formed with guide rod bores communicating with the interior of said cylinder structures of said advance-retract cylinders.

10. The improvement set forth in claim 1 further comprising a rotary motor and transmitting means for transmitting torque from said rotary motor to said feed screw, wherein each of said injection cylinders comprises a cylinder structure comprising a cylinder member and a cylinder end cap, and each injection cylinder further comprises a piston slidably mounted in said cylinder structure, a bridge operatively connecting said pistons of said injection cylinders to said feed screw, said rotary motor and said transmitting means being mounted on said bracket and being freely accessible from the outside of said unit, said cylinder end cap and said cylinder member being provided with respective guide rings, which are axially spaced apart, and each of said pistons of said injection cylinders being axially guided by said guide rings of the associated cylinder structure.

11. The improvement set forth in claim 1, wherein said plasticizing cylinder has front and rear ends and in front of said rear end, a radial flange bears on said front end face of said block, said plasticizing cylinder having ramp surfaces extending near said rear end along a diameter of plasticizing cylinder on opposite sides of said injection axis, and clamping means for locking said plasticizing cylinder in said block, said clamping means being radially guided on said rear end face and formed with ramps being complementary to and bearing on respective ramps of said plasticizing cylinder and axially forcing said radial flange against said forward end face.

12. The improvement as set forth in claim 1, wherein said guide rods associated with said advance-retract cylinders are adapted to be axially fixed and a stationary inverted yoke having upwardly directed legs that differ in length and support said guide rods associated with said advance-retract cylinders and engage said guide rods at locations closely spaced from said advance-retract injection cylinders in front thereof.

13. The improvement set forth in claim 12, wherein said yoke is adjustable in height adjacent to each of said legs, said block comprising at its rear end face a bracket having a horizontal bottom surface formed with a horizontal groove that is at a right angle to said injection axis, and extending with a vertical clearance in said groove and carrying rollers, said rollers being rotatably mounted in said beam at opposite ends thereof and protruding downwardly from said groove to roll on a planar supporting surface, a vertical clamp screw extending through said bracket and screwed into said beam to secure said bracket to said beam, and two vertical leveling screws extending through and being screwed to said bracket on opposite sides of said clamp screw, said leveling screws being adjustable to vertically adjust said bracket relative to said beam on opposite sides of said clamp screw.

* * * * *